June 21, 1966　　　G. HALLDORSSON　　　3,256,800
COOKER-DIGESTER
Filed Jan. 17, 1963　　　　　　　　　　5 Sheets-Sheet 1
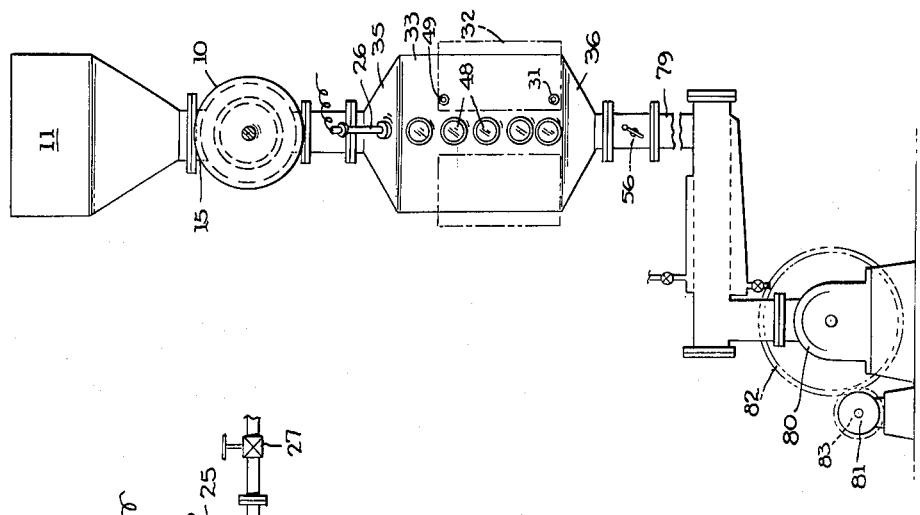
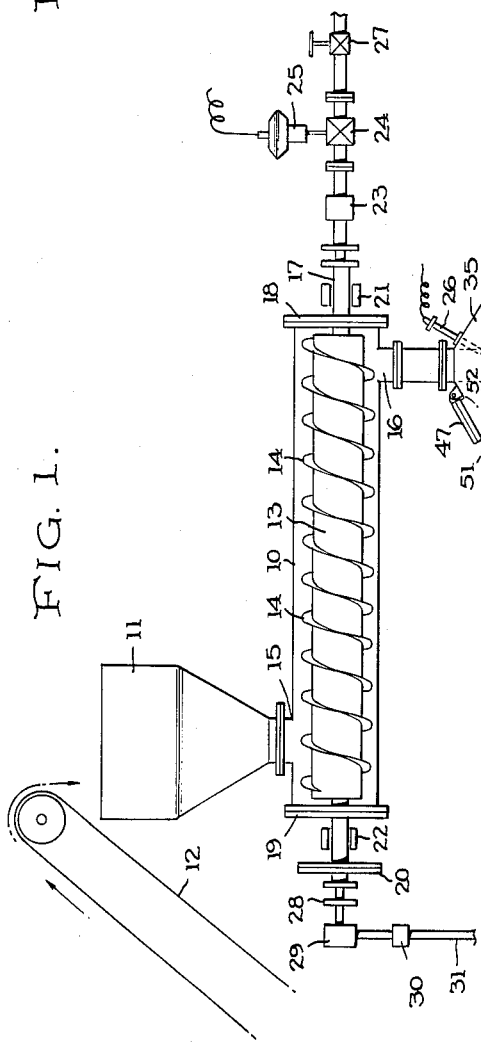
INVENTOR
GISLI HALLDORSSON
BY *Cameron, Kerkam & Sutton*
ATTORNEYS June 21, 1966 G. HALLDORSSON 3,256,800
COOKER-DIGESTER
Filed Jan. 17, 1963 5 Sheets-Sheet 2

INVENTOR.
GISLI HALLDORSSON
BY Cameron, Kerkam & Sutton
ATTORNEYS

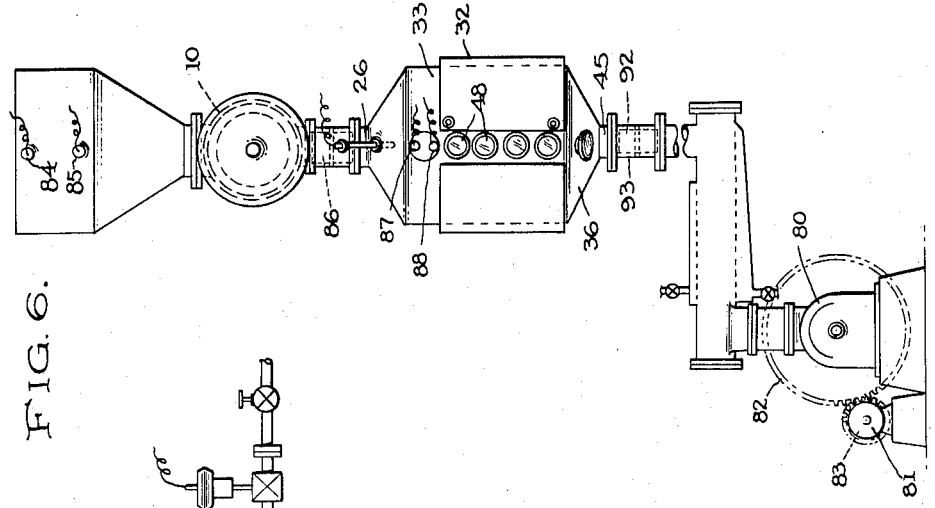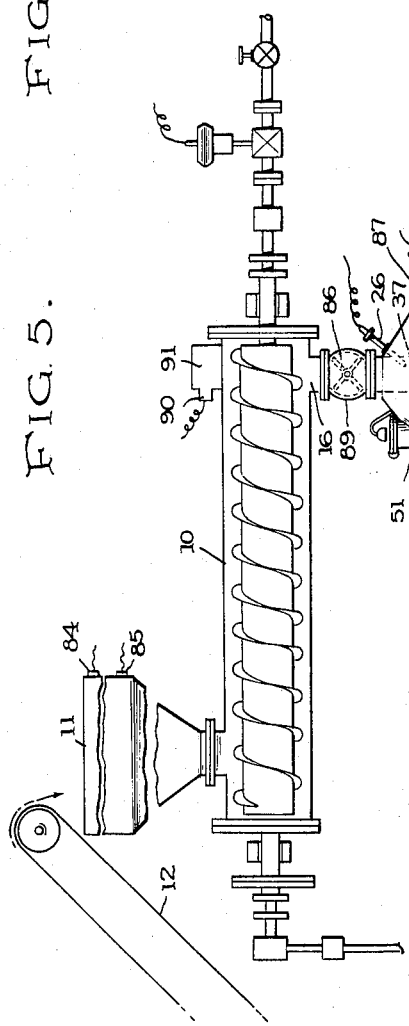

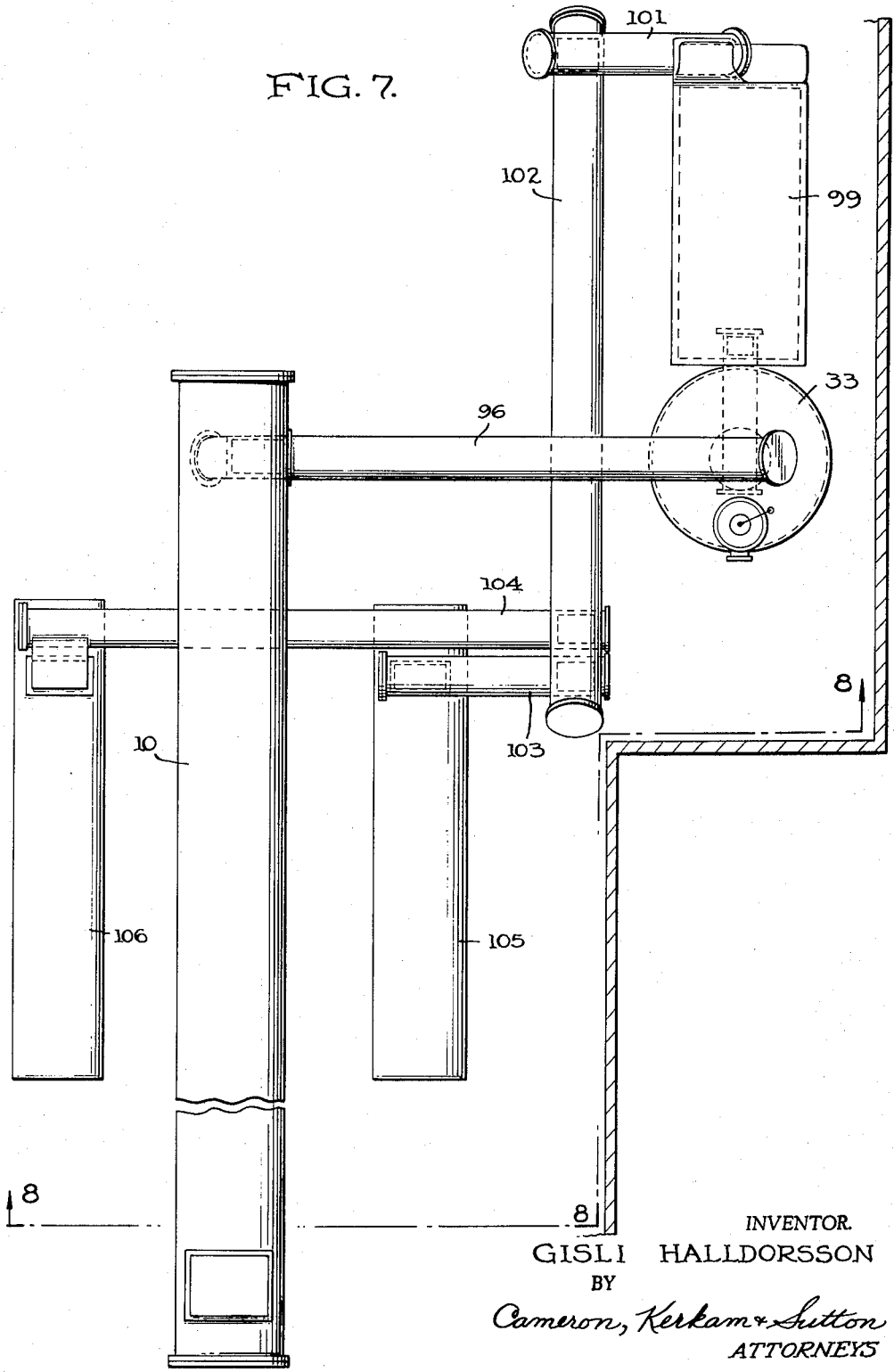

June 21, 1966  G. HALLDORSSON  3,256,800
COOKER-DIGESTER

Filed Jan. 17, 1963  5 Sheets-Sheet 5

INVENTOR.
GISLI HALLDORSSON
BY
Cameron, Kerkam & Sutton
ATTORNEYS

United States Patent Office 3,256,800
Patented June 21, 1966

3,256,800
COOKER-DIGESTER
Gisli Halldorsson, Hafnarstaeti 8, Reykjavik, Iceland
Filed Jan. 17, 1963, Ser. No. 252,157
5 Claims. (Cl. 99—246)

This invention relates to an improved cooker-digester for fish and other organic or inorganic materials which has numerous advantages over the conventional screw-type cookers currently in use and which greatly increases the output capacity of such screw-type cookers.

The invention contemplates the provision, adjacent the discharge end of a conventional screw-type cooker of a large capacity, cylindrical digester which is insulated and which may be jacketed to receive heating condensate from the screw cooker and which receives partially cooked, hot fish or other material from the screw cooker and retains it at 80–85° C. until its own heat completes the cooking and sterilizing. The material in the digester moves downwardly therein by gravity, cooking progressively as it descends.

The digester preferably has a capacity at least five times that of the screw cooker and is designed to hold up partially cooked material from the screw cooker until cooking and sterilizing thereof have been completed. As material in the digester gradually becomes cooked and sterilized, it moves downwardly by gravity, in the digester, normally in a digesting cycle of about 12 minutes, and is progressively fed by gravity or other means from the outlet of the digester to the press.

Using this new digester it is possible to preheat and partially cook the material in a comparatively small and relatively inexpensive screw cooker, or pre-heater, and then pass the partially cooked hot material into the large insulated and jacketed digester, where cooking is completed by the heat of the material itself.

The cooked material, after leaving the digester, is screened to remove water and is then passed to a press wherein the balance of the oil content is pressed out and a dry cake is evolved.

In conventional operations of this type wherein menhaden, herring, pilchards, or similar oily organic material is cooked, it is usual to utilize a steam-heated screw cooker on the order of 40 feet in length by 4 feet in diameter which has a comparatively low tonnage output of cooked material per hour. Such screw cooker installations are extremely expensive and comparatively inefficient.

Further, in processing fish material in the conventional screw cooker, when the fish being processed is spoiled and of thin consistency the material being cooked has a tendency to flow or "float" through the screw cooker at too rapid a rate. This results in an inferior, only partially cooked product being delivered to the press. Further, the product which is delivered to the press contains substantially all of the oil originally in the starting material (about 20% by weight in oily fish) which greatly increases the work of the press and pressing time and results in an end product with an undesirably high oil content.

The novel digester of the present invention used in conjunction with the screw-cooker not only greatly increases the hourly output of the cooking system but it also eliminates a high percentage of the oil content of the starting fish material. Further, due to its comparatively lengthy retention of the partially coked material at cooking temperature, approximately 85° C., it completely sterilizes the material, eliminating the objectionable bacteria "salmonella" and producing a highly improved product.

The digester, which is preferably of a capacity of about six tons of partially cooked fish, is provided at its upper extremity with a novel oil removal system which acts continuously to remove the considerable volume of oil which collects on top of the fish material therein, usually about 20% of the volume of the digester, and thus materially reduces the oil content of the material cooking in the digester whereby a much leaner product is delivered from the digester to the press or presses. This greatly reduces the work of the press and also reduces pressing time. This results in a better and much leaner press cake and a higher hourly output of lean press cake from the press.

It is further contemplated to provide within the digester conical baffle means beneath the inlet pipe at the top of the digester and another above the outlet at its bottom to further improve its efficiency of operation by checking the fall of partially cooked fish entering the digester from the cooker and preventing this raw material from "surging" vertically down the center of the digester. The upper baffle also acts to "hold" the entering material in the upper level of the digester and eliminates the pulling down of oil from the oil layer at the top of the digester into the material therein.

This invention is predicated on the novel concept of cooking oily fish and other organic material by first preheating it to the desired temperature, thus partially cooking it and then delivering the hot partially cooked material into an enlarged, insulated digester tank where it is retained until completely cooked by its own heat. The digester is so designed that as new, partially cooked hot material is fed into the upper section of the digester it forces the material in the digester downwardly by gravity, the compressed, hot material in the digester literally "cooking itself" as it moves downwardly under the influence of gravity and the weight of the mass of hot material above it.

It is further contemplated to provide a heating jacket or manifold about the outer periphery of the digester, fed hot condensate from the pre-cooking unit, to maintain the heat of the mass of material in the digester at the cooking point, i.e., normally 80–85° C.

The precooker is normally in the form of a screw cooker comprising a cylindrical outer shell and a hollow internal rotating screw supplied with a controlled amount of steam through a hollow shaft, to maintain it at cooking temperature. The rotating, hollow screw acts not only to heat and partially cook the material fed into it but also progressively moves this material down its length to the exit end, where the hot, partially cooked material is delivered to the digester. The capacity of this pre-cooker may vary widely, but normally it should have a filled capacity of about 1 ton.

The preferred temperature in the pre-heater is 80–85° C. and the time of passage therethrough or the time of pre-heating therein should be on the order of 2 minutes.

The amount of feed from the screw-cooker to the digester may be controlled by varying the speed of rotation of the hollow, steam heated screw. For most fish material, i.e., menhaden, herring, pilchards or other oily fish the speed of rotation should be from 2–6 r.p.m. to insure a pre-cooking time of two minutes and a satisfactory heating of the material to a temperature of 80–85° C. prior to delivery to the digester.

If the material being pre-cooked is spoiled and of thin consistency it has a tendency to "flow through" the screw-cooker too rapidly, thus when this type of material is being processed the speed of rotation of the screw should be reduced to insure a retention time in the cooker sufficient to heat the material up to the desired temperature prior to its delivery to the digester.

The screw-cooker also has the ancillary function of reducing the raw, entering material in size, comminuting it as it is passed through the screw cooker by the screw flights.

With respect to the digester itself, the downward movement of the material cooking therein is by gravity, assisted by the weight of material in its upper portion. As new material is fed into the upper level of the digester from the screw cooker its weight tends to force the material in the digester downwardly, fully cooked material issuing from the delivery duct at the bottom of the digester.

Valve means are preferably provided in the delivery duct at the bottom of the digester to control the rate of delivery of cooked material therefrom and further to control the length of time of retention of material in the digester. The valve in the delivery duct of the digester may be dispensed with, resulting in a "free" gravity flow from the digester, the speed of delivery from and time of retention of material in the digester then being controlled solely by the speed of rotation of the screw-cooker, which controls the rate of delivery of pre-heated material to the digester. The same "gravity feed" may be accomplished by maintaining the delivery duct valve in fully opened condition.

If time of retention of material in the digester is insufficient and the material delivered is not properly cooked the duct valve may be closed a proportionate amount to slow delivery and increase time of retention in the digester, and to insure complete cooking of the material therein. If the valve is fully closed, delivery from the digester will stop and material will be held up until it is opened. As aforesaid, the capacity of the screw-cooker is preferably 1 ton of raw material. The preferred capacity of the digester for such a screw cooker is 5–6 tons, the digester being of at least five times the capacity of the screw-cooker.

As the screw cooker delivers 1 ton of pre-heated, partially cooked material, at a temperature of 80–85° C., to the digester every two minutes, at the start of a cooking cycle, when the digester is empty, the exit duct valve of the digester should be maintained fully closed for at least ten minutes until inspection indicates that the digester is filled to the proper level, a fillage of 5–6 tons, before the valve is opened and the cooking-digesting cycle is started.

A thermocouple is provided in the upper portion of the digester to register the heat of material entering the digester from the screw-cooker. This thermocouple is connected to a heat-responsive valve motor which controls the steam valve in the hollow shaft of the screw-cooker to control the supply of steam to the screw-cooker and thus maintain the screw-cooker and product temperature at the proper level. Thus, if the temperature of the product entering the digester from the screw-cooker falls below the desired level (80–85° C.) the thermocouple will sense this condition and open the steam valve to supply more steam to the screw-cooker. Conversely, if the product temperature is too high, the thermocouple control will close the steam valve through the valve motor.

The digester is preferably provided with a vertically disposed series of inspection windows, dividing it into zones of about 1 ton each, in capacity. By inspection through these windows the fillage of the digester can be checked. If fillage should fall too low the speed of the screw-cooker can be increased until fillage reaches the proper "full" level, or the discharge valve can be closed, or partially closed, until the fillage in the digester builds up to the desired level.

It is therefore a primary object of this invention to provide a large volume, insulated and jacketed digester beneath the output end of a conventional screw cooker to hold and retain partially cooked hot material from the screw cooker until it is fully cooked and sterilized and to thereby greatly increase the output of the cooking installation and improve the quality of the product.

It is a further object of this invention to provide improved means for delivering cooked material from the digester to the press.

It is a further object of this invention to provide an oil removal system at the top of the digester to reduce materially the oil content of the material therein.

It is a further object of this invention to provide improved baffle means within the digester to prevent penetration of partially cooked material to the lower portion of the digester and to hold down the oil content of the body of the material cooking in the digester.

It is an object of this invention to provide similar baffle means above the outlet of the digester to retain material therein.

It is another object of this invention to provide improved controls and inspection means for the digester.

Other and further objects of this invention will become apparent as this specification proceeds.

Referring to the drawings,

FIG. 1 is a side view, partially broken away and in phantom, of one embodiment of a cooking, digesting and pressing installation in conformity with the present invention, including a straight gravity feed from the screw cooker into the digester and a mechanical gate valve controlling the output of material from the digester to the press disposed beneath it;

FIG. 2 is an end view of this embodiment of the structure;

FIG. 5 is a plan view of an alternative embodiment of the installation in which the feed to the screw cooker is controlled through membrane controls, the feed therefrom into the digester is similarly controlled through a rotary valve and the feed from the digester to the presses is also through a rotary valve controlled by a membrane switch;

FIG. 6 is an end view of this embodiment of the invention;

FIG. 7 is a plan view, partially in phantom, of an alternative embodiment of the installation, in which the feed is to two presses and in which the feed into and from the digester is through pressure controlled rotating valves;

Figure 3:
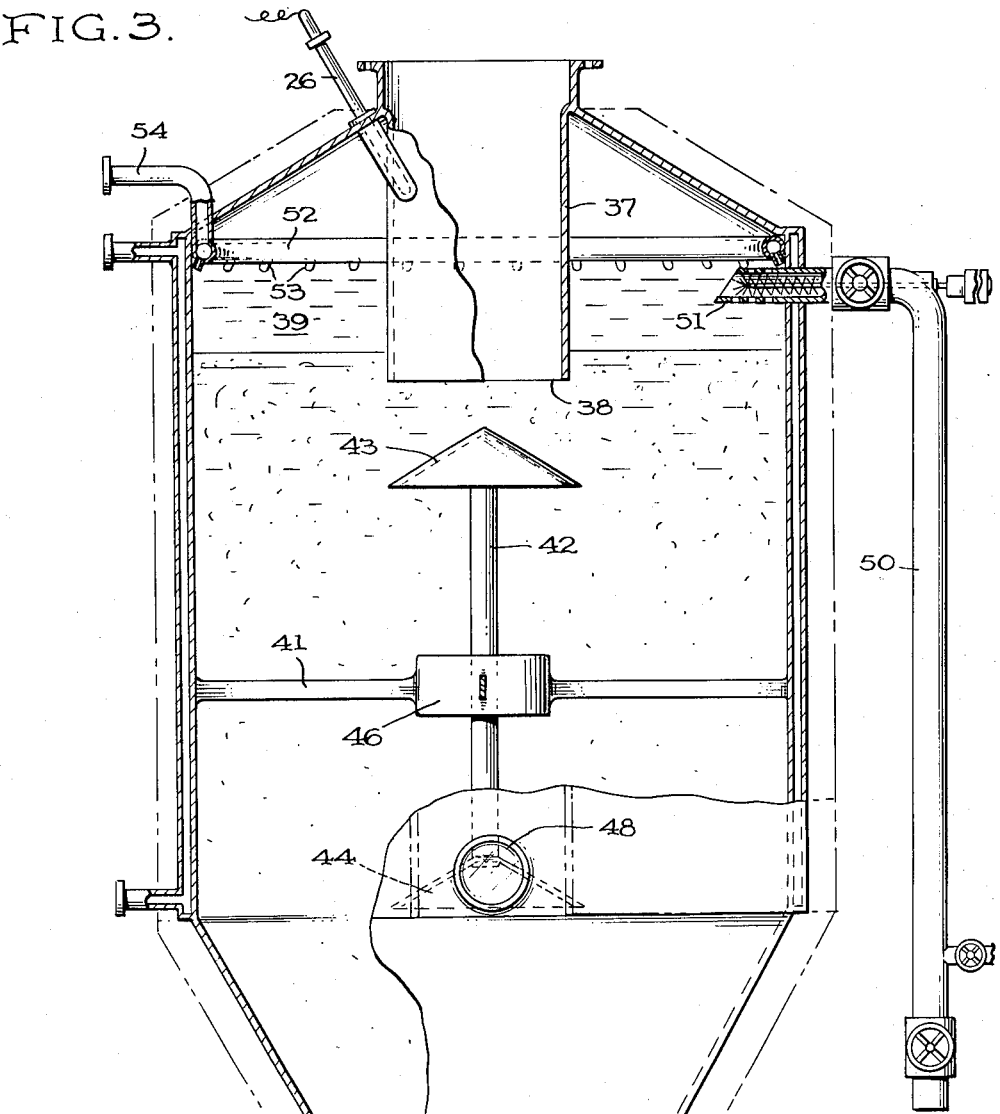
FIG. 3 is an enlarged vertical section view, partially broken away, of the improved digester structure showing the elongate inlet neck, the improved internal baffle structure, the adjustable gate valve at the lower extremity thereof and the pipe means for continuously withdrawing the body of oil which accumulates above the solid material cooking within the digester.

In the drawing, FIGS. 1, 2 and 3, 10 indicates the screw cooker conveyor which is an elongate cylinder and which is provided at its inlet extremity with feed chute 11 into which raw fish material is fed from endless conveyor 12. Rotatably mounted within the cylindrical outer shell of cooker 10 is hollow screw body 13, also cylindrical in shape and of about one half the diameter of the outer shell and is disposed coaxially therewithin. Hollow screw body 13 is provided about its outer periphery with continuous screw flights 14, which may be solid or hollow, as desired. Screw body 13 extends substantially the entire length of the cooker shell 10. Flights 14 have a small clearance with the interior wall of the outer shell of cooker 10 and are of such a pitch as to force material gradually through cooker 10 from inlet 15 to outlet 16, as hollow screw body 13 rotates. The speed of passage of material through the screw cooker from entry duct 15 to outlet duct 16 is controlled by the speed of rotation of hollow screw body 13.

Hollow screw body 13 is mounted on hollow shaft 17 which rotatably passes through end walls 18 and 19 of the cylindrical shell of cooker 10. Hollow shaft 17 is welded or otherwise affixed to the end walls of screw body 13 and communicates with the interior thereof to supply steam to the interior of screw body 13 and flights 14.

Pulley or gear 20 is provided at the outer extremity of hollow shaft 17 to provide rotation therefor from a suitable source of power, not shown. Bearings 21 and 22 are provided about hollow shaft 17 outwardly of end plates 18 and 19, respectively, of the cylindrical casing of cooker 10. Rotating coupling 23 is provided on hollow shaft 17 adjacent steam valve 24 which is appropriately actuated by electric valve motor 25, which is preferably of the well-known bellows type. Valve motor 25 is under the direct control of digester thermocouple 26, as will hereinafter be discussed in more detail. Steam line valve 27 is provided outwardly of valve 24 to control the steam supply to the system.

At its opposite extremity hollow shaft 17 is provided with stuffing box 28 and rotating coupling 29. Condensate is scooped up at the terminal extremity of hollow screw body 13 and delivered to the steam trap 30 whence it is passed by pipe 31 to the jacket 32 of digester 33 to assist in maintaining a cooking temperature of approximately 85° C. therein.

Thermocouple 26 is inwardly disposed through the upper side wall of cap 35 of digester 33. Thermocouple 26 senses the temperature of material entering the upper portion of digester 33 from the outlet duct 16 of screw cooker 10 and is in circuit with the bellows type motor control 25 of steam valve 24 controlling the supply of steam to shaft 17. Thus, when the temperature of material entering the digester 33 falls below 85° C. thermocouple 26 will act through motor 25 to open valve 24 and increase the amount of steam supplied to screw body 16 and when temperature rises above 85° C. it will act to close valve 24.

Referring specifically to the digester structure shown in FIGS. 1, 2 and 3 it will be seen that digester 33 comprises broadly a cylindrical body portion 34 and conical upper and lower caps 35 and 36 welded or otherwise appropriately affixed over its upper and lower extremities. The approximate capacity of the screw-cooker conveyor 10 is preferably one ton of raw material and the preferred capacity of digester 33 is five to six tons of material, it preferably having a volume of about six times that of the screw-cooker conveyor.

Digester 33 is preferably formed of steel, is insulated over its outer surface and provided with a hot water jacket about its periphery to keep the heat up within the digester.

Digester 33 is connected at its upper extremity to the discharge pipe 16 of screw-cooker conveyor 10 by means of elongate pipe 37, which, as shown, extends downwardly into digester 33 a considerable distance, whereby its lower, open extremity 38 is disposed below the lower surface of the body of oil 39 which collects above the mass of semisolid hot fish material 40 filling most of the interior of digester 33. As shown, elongate pipe section 37 is preferably made integral with upper cap 35 of digester 33.

Mounted within digester 33, as by means of a flexible, four arm spider frame 41 is a vertical baffle rod 42 mounted vertically at the center of spider frame 41 and lying in the axis of digester 33. Baffle rod 42 is provided at its upper extremity with a conically shaped baffle 43 which is centered directly beneath exit mouth 38 of elongate discharge pipe 37 and which is of slightly larger diameter than pipe 37. At its lower extremity baffle rod 42 is provided with a second conical baffle 44 disposed directly above the mouth of digester outlet pipe 45 and which is of slightly greater diameter than outlet pipe 45. Conical baffle 43 acts to interrupt the fall of material into digester 33 from cooker 10 and prevents the "surging" or penetration of partially cooked material from cooker 10 downwardly into the mass of material in digester 33. It acts to "spread out" new material in the upper portion of digester 33 and prevents the pulling of oil from oil layer 39 downwardly into the digester.

An ultrasonic vibrator 46, of any well known type, actuated from a suitable electrical source, may be provided, as shown, at the center of baffle rod 42 to impart vibrations to rod 42 and conical baffles 43 and 44 to agitate the material cooking in digester 33 to assist in liberating oil therefrom.

A glass-covered inspection window and cleaning port 47 is provided in cover 35 of digester 33 to facilitate inspection of the contents of digester 33 during the cooking operation. Further, a vertical row of preferably five inspection windows 48 is provided in the side wall of digester 33, dividing it into five "inspection zones," each of which holds approximately one ton of material. By inspection through windows 48 the level of material in digester 33 can be determined. Normally, digester 33 should be operated at full capacity, as it is most efficient when it is filled to top level. If the level of material in digester 33 falls too low it can be brought up by closing the exit valve or by increasing the speed of the screw-cooker.

As aforesaid, hot water jacket 32 is provided about the outer periphery of digester 33. Jacket 32 is fed condensate from trap 30 through pipe 31, condensate being taken off from jacket 32 through pipe 49. This "hot" jacket assists in maintaining heat in digester 33 at 80–85° C.

In normal operation of the digester a considerable body of oil 39 collects above the semisolid, partially cooked hot material in the upper portion of the digester. This oil layer 39 collects above the cooking mass in the digester by a gradual upward percolation through the semisolid fish material in the body of the digester and should be continuously removed from digester 33 to reduce the oil content of the cooking mass and to insure delivery to the press of as lean a cooked product as possible. Therefore, an oil exhaust pipe 50 is provided, let through the upper side wall of digester 33 with its perforated screened inner extremity 51 extending well into the interior of the upper portion of digester 33 and into oil bed 39. Rotating knife means may be provided within the screened extremity 51 of pipe 50 to maintain it clear of solid material and to assure ready outward flow of oil therethrough. Provision may be made for the periodic admission of steam to pipe 50 to clear screened extremity 51. Pipe 50 is provided with appropriate pump means, not shown, to assist in withdrawing oil from layer 39.

As shown in FIG. 3, a wash-down pipe 52 may be mounted about the inner, upper periphery of digester 33, provided with nozzles 53 and fed from steam or hot water pipe 54, through which the digester may be periodically washed down and cleaned, when empty.

At the center of lower cap 36 digester 33 is provided with outlet pipe 55, fitted at its lower extremity with a gate valve 56 controlling the output from digester 33. Gate valve 56 is preferably provided with a circular flange at its upper extremity which is appropriately bolted to corresponding flange of pipe 55, a suitable gasket being provided therebetween.

Figure 4:
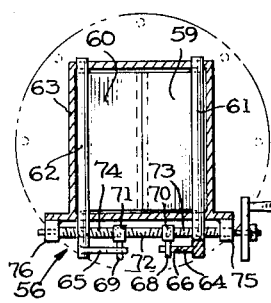
FIG. 4 is a detailed cross-sectional view, from above of the adjustable gate valve.

Referring to FIGS. 3 and 4 of the drawings, it will be seen that gate valve 56 comprises two separate gates 59 and 60 mounted on shafts 61 and 62 with which they move. Shafts 61 and 62 are rotatably mounted in the end plates of rectangular housing 63 and at their extended outer extremities are provided with fixed, downwardly extending arms 64 and 65. Arms 64 and 65 are preferably slotted at their lower extremities at 66 and 67, to engage studs 68 and 69 of nuts 70 and 71. Nuts 70 and 71 are screw-threaded and engage the screw-threaded extremities of actuating shaft 72. Shaft 72 is provided about its right-hand extremity with left-hand screw threads 73 and about its left-hand extremity with right-hand screw threads 74. Shaft 72 is rotatably mounted at its extremities in bearings 75 and 76 on housing 63 and is provided with a control hand wheel 77 at one end. It will thus be seen that clockwise rotation of hand wheel 77 will move nuts 70 and 71 outwardly on shaft 72 and will thus swing arms 64 and 65 outwardly turning shafts 61 and 62 and opening gates 59 and 60. A reverse or counter-clockwise rotation of hand wheel 77 has the opposite action, moving nuts 70 and 71 inwardly on shaft 72 and briging gates 59 and 60 toward each other to reduce the size of the outlet opening from digester 33.

Extending downwardly from the mouth 78 of gate valve 56 is discharge pipe 79 which feeds cooked material from digester 33 into rotating screen 80 whence it is passed to press 81. Screen 80 and press 81 are rotated through gear 82 from appropriate power source 83.

Referring specifically to the embodiment of the invention shown in FIGS. 1, 2 and 3 just described, the screw cooker 10 preferably has a filled capacity of approximately one ton of raw fish and the digester 33 a capacity of preferably six tons of fish. The digester 33 can thus readily process approximately thirty tons of fish per hour, insuring a digesting or cooking time of 12 minutes at 80–85° C. from entry into the digester to discharge therefrom. As screw-cooker 10 has a capacity of one ton of material, the time of passage through the screw-cooker, for preheating and partially cooking the material, should normally be about 2 minutes.

As aforesaid, the digester has five, verticaly disposed inspection windows 48 in its wall. The distance between the centers of windows 48 is so calculated, with respect to the diameter of the digester and the specific weight of the fish to be processed, i.e. herring, for example, (0.9) that it will hold approximately one ton of material between windows. Let us assume that the best cooking time for herring, at 85° C., is 10 minutes, varying with the condition and freshness of the herring, and that it is desired to process twenty-four tons of herring per hour. If we maintain the digester filled to the center of the next to the top window 48, or window No. 4, four tons of herring will be held up in digester 33. In order to process 24 tons per hour, this four ton fillage must be passed through the digester six times in one hour. This would give a processing time of 60/6=10 minutes.

Where M is processing time in minutes, F is fillage in tons, depending on level, and T is tonnage of herring (or other material) being processed per hour through the digester we find:

$$M = \frac{60 \times 4}{24} = 10 \text{ minutes.}$$

If the desirable processing time is known and the amount of material to be processed is known, the desired level can be determined from the same formula, i.e.

$$F = \frac{M \times T}{60},$$

which in the present instance would give $$F = \frac{10 \times 24}{60} = 4 \text{ tons,}$$

the level at window No. 4, as aforesaid.

If the hourly mass in tons of raw material cooked in the digester is referred to as T the formula for the relation of processing time, fillage and output would be $$F = \frac{M \times T}{60}$$

and from this formula the correct level in digester 33 can be calculated when the processing time has been selected and the output per hour is known. Thus, if the capacity of digester 33 is six tons, if a processing time of 12 minutes is utilized in the digester, its hourly output of thoroughly cooked product will be thirty tons. If observation indicates that the digesting time is too short the output of digester 33 may be appropriately reduced through gate valve 56 of screw-cooker 10 to prolong the retention and cooking time in digester 33 to a satisfactory point, proportionately reducing the hourly output from digester 33.

The provision of oil removal pipe 50 and its screened extremity 51 extending into oil layer 39 at the upper end of digester 33 assures the continuous removal of oil collecting in layer 39 above the mass of fish being processed in digester 33. This results in a leaner cooked product entering press 81 and a reduced pressing time. A highly superior product and increased output result.

Further, due to the fact that the material is retained normally for at least 12 minutes in digester 33, from time of entry until time of exit, at a temperature of from 80 to 85° C., the virus "salmonella," which derives from the intestines of menhaden, is killed and the material is thus sterilized in the digester, eliminating the necessity for sterilizing the dried fish meal in special sterilizing towers, as has been customary. This results in considerable saving and a much purer and more desirable product.

Referring now to the embodiment of the invention shown in FIGS. 5 and 6, it will be seen that in this embodiment more positive feed controls are provided for the delivery of material into the cooker chute 11, from the screw cooker 10 to the digester 33 and from the digester to the rotary screen and press. These modified controls comprise broadly a series of pressure sensitive membrane switches controlling the power to the feed elements throughout the screw cooker and digester system and through the press or presses at the terminal end of the system.

Thus, referring first to the cooker chute 11 in this embodiment of the invention, FIGS. 5 and 6, high and low level membrane switches 84 and 85 are provided, respectively, in the upper and lower sections of chute 11, membrane switch 84 defining the top or "full" limit of the chute 11 and membrane switch 85 controlling the "low" limit thereof. Thus, when the material in chute 11 rises to the top limit, as defined by membrane switch 84, pressure against membrane switch 84 will break the circuit to the motor driving raw fish conveyor 12, stopping conveyor 12 and cutting off feed into chute 11. If the level in hopper 11 should fall below the "low" limit, as defined by lower membrane switch 85, switch 85 will close the circuit to the power source for conveyor 12, initiating feed to chute 11.

Membrane control switches of this type are well known in the industry and have been widely used. Suitable membrane control switches of this type are shown in Fields et al. Patent No. 2,633,509.

As aforesaid, this embodiment of the invention contemplates the use of driven rotary unloading valves between the screw-cooker 10 and the digester 33 and between the digester and the press. These rotary unloading valves are also preferably controlled by membrane switches, responsive to pressure in the system, as will hereinafter be described in more detail.

Thus, four bladed rotary valve 86 is provided between the outlet 16 of screw-cooker 10 and elongate inlet duct 37 of digester 33. Rotary valve 86 is driven from a variable source of power, not shown, in a well-known manner. High and low level membrane switches 87 and 88 are located, as shown, at "high" and "low" levels in the upper wall of digester 33. Rotary valve 86 is rotatably mounted in cylindrical housing 89 set in pipe 37 between the screw-cooker conveyor 10 and digester 33. The rate of delivery by rotary valve 86 is directly proportional to its speed of rotation. When valve 86 stops, feed stops. Thus, when the level of partially cooked fish and oil in digester 33 rises to the top level, as defined by membrane switch 87, the upper limit control, the pressure will actuate switch 87, breaking the circuit to the variable drive motor for rotary valve 86, stopping the valve and cutting off the feed from screw cooker 10 to digester 33. When the level of material in digester 33 falls below membrane switch 88, the "low" limit, the circuit to the drive motor for rotary valve 86 will be closed, rotary valve 86 will begin rotating and feed will recommence between screw-cooker conveyor 10 and digester 33.

A further membrane switch 90 is provided in pressure chamber 91 positioned, as shown, at the outlet end of screw cooker 10, membrane switch 90 controlling the drive motor for gear 20 rotating hollow rotor 13. Thus, should the pressure in the outlet end of the screw cooker 10 rise above the optimum level, membrane switch 90 will be actuated, breaking the circuit to the drive motor for the drive to gear 20, thus stopping the rotor 13 of the screw-cooker conveyor until pressure falls.

Rotary valve 92, also of the four bladed type is positioned in cylindrical housing 93 set into unloading pipe 45 positioned between the lower extremity of digester 33 and rotary screen and press 80 and 81. The power source for rotary valve 92, not shown, is controlled by membrane switches 94 and 95 under the direct influence of the presure and head of material in the press 81. Thus, if pressure in press 81 rises above optimum level the circuit to the power source for rotary valve 92 will be broken, valve 92 will stop and feed from the digester 33 to press 81 will thus be terminated until pressure in press 81 falls back to the desired level. If, however, the head in press 81 falls below the "low" level, as defined by membrane switch 95, switch 95 will be actuated to close the circuit to the power source for valve 92, starting valve 92 and feed to press 81.

This embodiment is preferred in some instances to that disclosed in FIGS. 1, 2, and 3, in which the feed from the screw-cooker 10 into digester 33 is by gravity, the rate of feed from screw-cooker 10 being controlled by the speed of the rotor 13 and the amount of material delivered from digester 33 is manually controlled through the gate valve 52. Normally, regulating the speed of rotor 13 in the screw-cooker conveyor, between three and six r.p.m. will provide satisfactory feed throughout the system. The rotary valves 86 and 92 merely act, respectively, to refine feed control from the screw-cooker into the digester and from the digester to the press.

It will be noted that the embodiment of the invention shown in FIGS. 5 and 6 also includes the novel elements disclosed in the embodiment shown in FIGS. 1, 2 and 3, i.e., the elongate unloading pipe 37 extending downwardly into digester 33 below rotary valve 86, the baffle and rod structure 42–43–44 and the oil drain pipe system 50–51 to remove the head of oil which collects above the material in digester 33. Aside from the membrane switch controls for the rotary valves and those for the rotor of the screw-cooker conveyor and the loading conveyor the balance of the elements in this embodiment is identical to that in the gravity feed embodiment of the invention.

Figure 8:
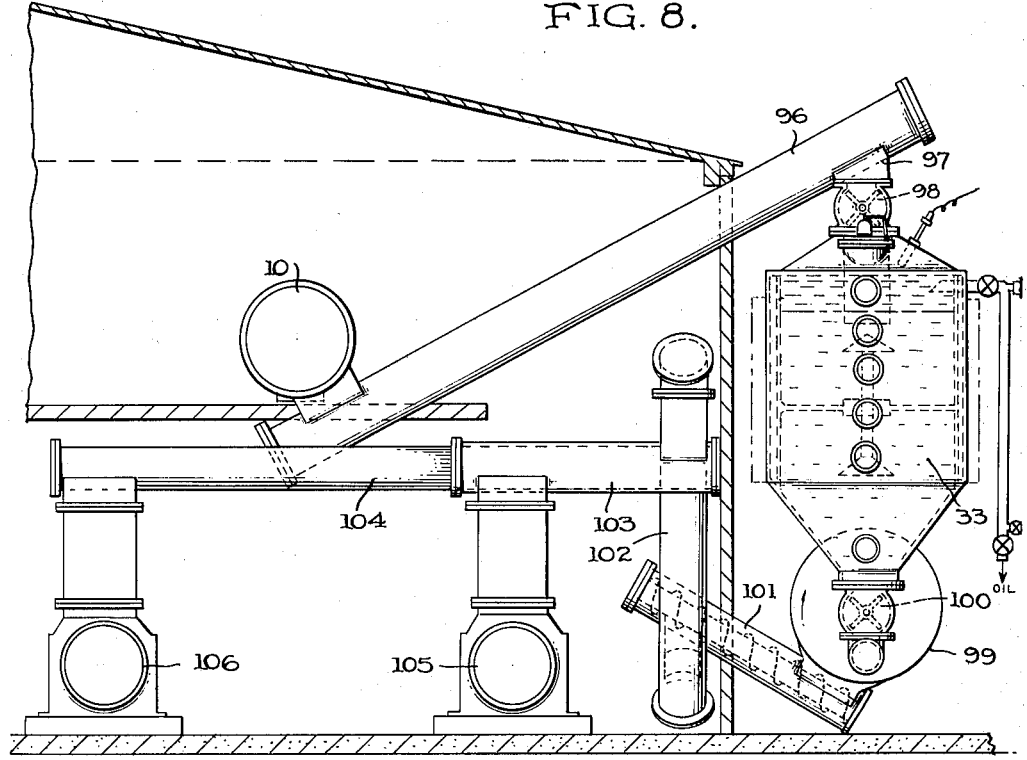
FIG. 8 is an end view of this embodiment of the invention.
Figure 9:
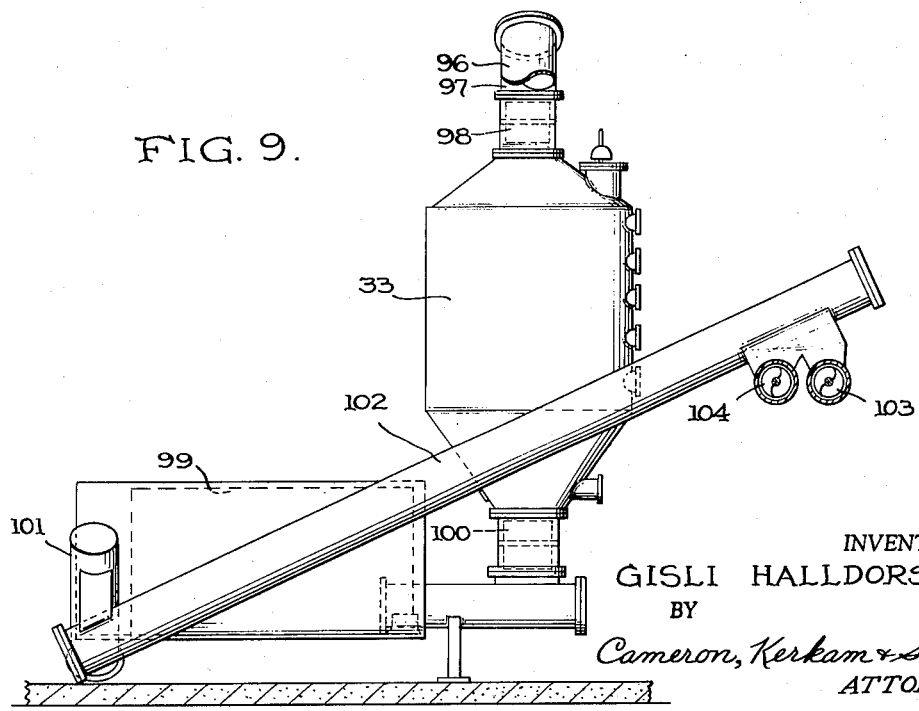
FIG. 9 is a side view of the embodiment of the installation shown in FIGS. 7 and 8.

A two press plant installation incorporating the novel features of the invention is illustrated in FIGS. 7, 8 and 9. Referring specifically to FIG. 7, it will be seen that screw-cooker 10 feeds directly into an angularly inclined screw conveyor 96. Screw conveyor 96 carries the preheated material upwardly to discharge 97 whence it feeds downwardly into digester 33, regulated by rotary valve 98, controlled by appropriate membrane switches, not shown. Here again, the structure of digester 33 is identical to that previously shown and described in the embodiments in FIGS. 1, 2, 3 and 5.

The feed from digester 33 to rotary screen 99, wherein most of the water is removed from the cooked material, is controlled through rotary valve 100, also under the control of appropriate membrane switches, not shown, as previously discussed.

From screen 99 the partially dehydrated, cooked material is delivered to screw conveyor 101 whence it is fed to angular screw conveyor 102 and thence to screw conveyors 103 and 104 for delivery, respectively to presses 105 and 106.

By thus utilizing two presses, the pressing time is cut in half and the efficiency and output of the system are greatly increased. This system is in all respects controlled as is that shown in FIGS. 4 and 5, however, with the inclusion of the ancillary conveying structures and the dual press installation.

While the feed from the pre-heater to the digester to the presses in this embodiment, is preferably controlled by rotary valves 98 and 100, these valves may be eliminated and feed throughout may be by gravity alone, the amount of feed to the system then being controlled by the speed of rotation of the screw-cooker and the delivery therefrom.

As aforesaid, digester 33 is preferably of a capacity of up to six tons of partially cooked fish or other organic material and can, on a 12-minute processing cycle, readily handle 30 tons of fish per hour. The screw cooker conveyor 10 has an approximate heating surface of 600 square feet and brings up the temperature of the fish material to approximately 85° C. before it enters the digester. The approximate dimensions of this screw-cooker conveyor are 46 feet in length by 3 feet 4 inches in diameter and the speed of rotation of the steam-heated screw conveyor 13 is normally between three and six r.p.m., depending upon the consistency of the raw fish material being processed and the output desired.

Normally the speed through the screw-cooker conveyor is controlled by the rate of rotation of the steam-heated screw rotor 13 which is normally rotated at such speed that approximately one ton of material will be preheated or precooked every two to three minutes.

In conventional installations where only the screw-cooker conveyor is utilized an hourly output of less than twelve tons is absolute maximum, as the speed of the screw-cooker must be greatly reduced to produce a complete cooking cycle on the raw fish material between the inlet and the outlet. Further, in the conventional installation, "salmon-ella" and other bacteria in the raw fish material pass through the entire cooking cycle without being killed and the product as it is fed to the presses directly from the screw cooker conveyor is unsterile and further sterilizing steps must be taken in special sterilizing towers after the dry product has been delivered from the presses.

Thus, the inclusion of the retaining digester in the system fed from the outlet of the preliminary screw-cooker produces a completely cooked and sterilized product in the approximately 12-minute digesting period and at 80 to 85° C. In the digester all bacteria in the cooked material are destroyed. The provision of the digester to hold and finally cook the preliminarily cooked material greatly improves the quality of the cooked product passing to the presses and substantially doubles the output of the system. This is particularly true when the material being worked on is spoiled and of soupy consistency as material of this type has a tendency to flow through the screw-cooker too rapidly and in conventional systems frequently passes through the screw cooker in substantially raw and highly undesirable condition.

The invention is susceptible of many modifications without departure from the spirit thereof.

The crux of the invention is the provision of the digester receiving pre-heated material from the screw-cooker and retaining it at cooking temperature (80–85° C.) for a sufficient period of time to insure complete cooking and sterilizing thereof. A further advantage of the digester system is the provision of the oil removal system at the upper end thereof which greatly reduces the oil content of the cooked material as it enters the presses.

The internal baffle structure in the digester reduces turbulence therein and prevents the penetration of raw or partially cooked material to the bottom area of the digester, maintaining it in the upper levels thereof until cooking has been substantially completed. Further, the elongation of the entry pipe from the screw-cooker a substantial distance downwardly into the digester below the oil layer prevents the passage of new material entering the digester through the head of oil collected in the upper level thereof and thus holds down the oil content of the material in the digester.

Numerous changes and modifications in details of this structure may be made without departing from the spirit of the invention.

Attention is directed to the appended claims for a limitation of the scope of this invention.

What is claimed is:

1. In a cooker-digester for fish and analogous organic material, a screw-cooker conveyor comprising a cylindrical outer shell closed by terminal end plates, a hollow rotary screw rotatably mounted within said shell coaxial therewith, a hollow shaft for said rotary screw let through the end plates of said cylindrical outer shell, a source of steam connected to said shaft, a steam valve in said shaft controlling the supply of steam to said hollow shaft and to said rotary screw, drive means for said hollow shaft, an inlet chute at one end of said casing supplying raw material thereto, an outlet duct at the opposite end of said casing delivering partially cooked material therefrom, an enlarged digester adjacent said outlet duct and joined thereto by an elongate feed pipe extending an appreciable distance into the upper portion of said digester, baffle means supported within said digester beneath the lower extremity of said feed pipe, a thermocouple in said digester controlling said steam valve, an outlet duct at the lower end of said digester and press means connected thereto to receive material from said digester.

2. In combination with a novel digester, a steam heated screw cooker which preheats the material to be digested, said digester including a cylindrical insulated body of enlarged diameter, end caps at the upper and lower extremities of said cylindrical body, an elongate feed pipe affixed through the center of the upper cap extending downwardly into the interior of said body, baffle means mounted within said body spaced from and disposed beneath the lower extremity of said feed pipe, a jacket about the outer periphery of said body, means communicating with said jacket feeding hot condensate thereto from the screw-cooker, an oil removal pipe let through the upper side wall of said body at right angles thereto, a thermocouple in the upper wall of said body controlling the supply of steam to said screw-cooker, an outlet duct at the lower extremity of said digester feeding material therefrom by gravity and press means connected to said outlet duct to press cooked material issuing therefrom.

3. An apparatus as in claim 2, said baffle means comprising a vertical rod mounted within said digester body provided with a conical baffle at its upper extremity beneath said entry pipe and a similar conical baffle at its lower extremity above said delivery duct.

4. An apparatus as in claim 2 including a screened inner extremity on said oil removal pipe and rotating cleaning means therewithin.

5. An apparatus as in claim 2, including vibrator means on said baffle rod to impart vibration thereto and to said baffles.

References Cited by the Examiner

UNITED STATES PATENTS

| | | | |
|---|---|---|---|
| 1,212,416 | 1/1917 | Stillson | 99—246 |
| 1,688,429 | 10/1928 | Murden | 210—415 |
| 1,722,015 | 7/1929 | Powling | 260—412.6 X |
| 1,782,714 | 11/1930 | Davidson | 23—290.5 |
| 1,821,639 | 9/1931 | Hiller | 23—290.5 X |
| 2,005,501 | 6/1935 | Kelly | 126—273 X |
| 2,112,784 | 3/1938 | McNitt | 99—234 X |
| 2,150,608 | 3/1939 | Olier | 23—270 |
| 2,269,898 | 1/1942 | Anderson | 23—290.5 |
| 2,331,910 | 10/1943 | Holly | 23—290.5 X |
| 2,374,425 | 4/1945 | De Weerth | 99—246 |
| 2,374,587 | 4/1945 | De Weerth | 99—246 |
| 2,468,636 | 4/1949 | Napier | 260—412.6 |
| 2,576,470 | 11/1951 | May | 210—413 |
| 2,589,287 | 3/1952 | Ryan et al. | 99—111 |
| 2,589,288 | 3/1952 | Ryan | 99—111 |
| 2,633,509 | 3/1953 | Fields | 200—61.21 |
| 2,870,028 | 1/1959 | Anderson | 99—1 X |
| 3,046,286 | 7/1962 | Speer et al. | 260—412.6 |
| 3,158,634 | 11/1964 | Marsh | 23—280 X |

FOREIGN PATENTS

| | | |
|---|---|---|
| 523,816 | 4/1921 | France. |
| 728,592 | 11/1942 | Germany. |
| 25,660 | 1889 | Great Britain. |
| 117,852 | 9/1918 | Great Britain. |
| 370,293 | 4/1932 | Great Britain. |

WALTER A. SCHEEL, *Primary Examiner.*

HYMAN LORD, ROBERT E. PULFREY, IRVING BUNEVICH, *Examiners.*

CLYDE I. COUGHENOUR, *Assistant Examiner.*